No. 702,868. Patented June 17, 1902.
R. CLUCAS.
SCRAPER FOR ROLLERS.
(Application filed July 11, 1900. Renewed Apr. 25, 1902.)
(No Model.) 2 Sheets—Sheet 1.
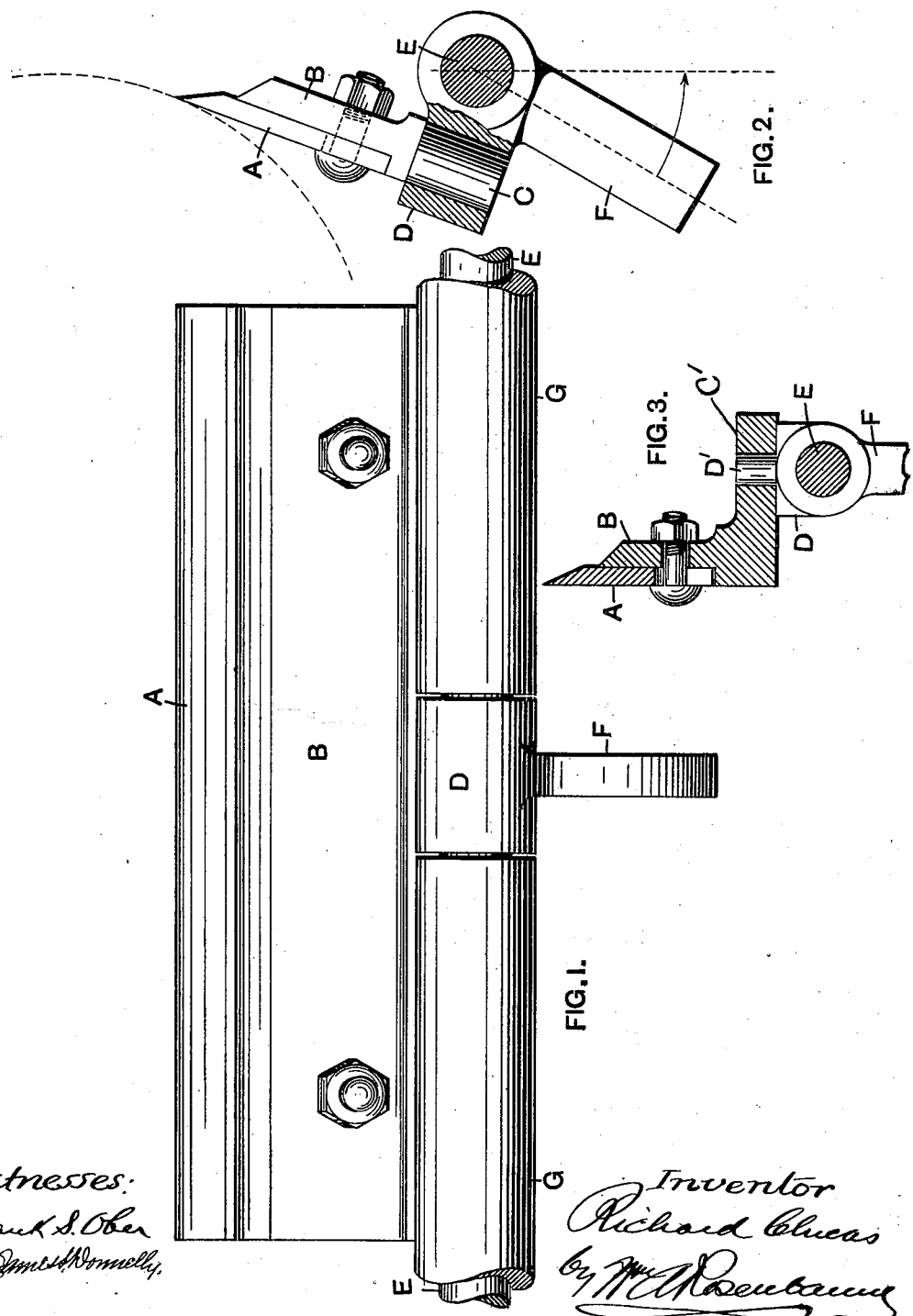

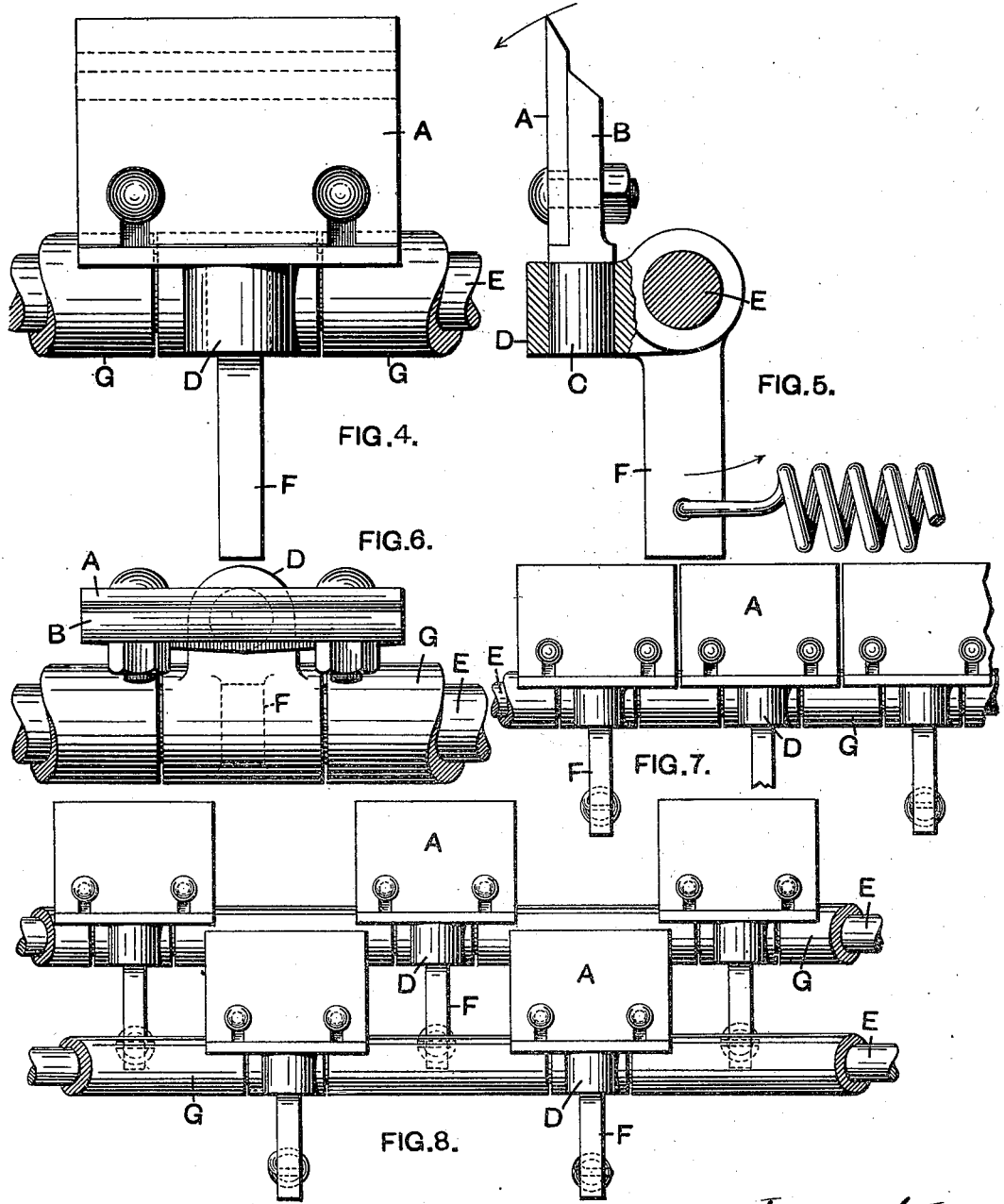

UNITED STATES PATENT OFFICE.

RICHARD CLUCAS, OF LIVERPOOL, ENGLAND, ASSIGNOR TO THE LIVERPOOL MALT COMPANY, LIMITED, OF LIVERPOOL, ENGLAND.

SCRAPER FOR ROLLERS.

SPECIFICATION forming part of Letters Patent No. 702,868, dated June 17, 1902.

Application filed July 11, 1900. Renewed April 25, 1902. Serial No. 104,630. (No model.)

*To all whom it may concern:*

Be it known that I, RICHARD CLUCAS, a subject of the Queen of Great Britain, residing at Liverpool, in the county of Lancaster, England, have invented certain new and useful Improvements in Scrapers for Rollers and Like Rotary Bodies, of which the following is a full, clear, and exact description.

When scrapers are used in connection with rollers, wheels, and similar rotary parts of machines, mills, vehicles, and the like, great difficulties are at present experienced when it is desired to obtain and maintain a constant, close, and uniform contact between the scraper and the rotary body throughout their common length, and these difficulties are increased when the wear of the parts in contact is not uniform, when the rotary body is or becomes heated, or when the rotary body is mounted in yielding bearings.

The object of this invention is to insure such constant, close, and uniform contact of the scraper with the periphery of the rotary body under all conditions of work and without the continuous personal supervision which is now necessary.

According to the present improvements the scraper or each section of the scraper is secured upon a carrier-bracket in such a manner that it may be freely self-adjusted by a movement having one or both of two components. One of these components is a motion of the carrier-bracket when permitted about an axis parallel with the axis of the rotary body, the other component being a motion about an axis at right angles with the said parallel axis. The scraper or each section of the scraper is held in contact with the rotary body by gravity or by springs, and its movement results from any displacement of the rotary body, from any accidental and temporary adhesion of matter thereto, from unequal wear of the scraper or rotary body, or from any other similar cause.

The accompanying drawings illustrate in what manner this invention may be carried into practice.

Figure 1 represents a front view of a scraper and its carrier-bracket, and Fig. 2 an end view of the same, partly in section. Fig. 3 shows in a sectional end view a modified form of the carrier-bracket. Fig. 4 represents a back view, Fig. 5 a sectional end view, and Fig. 6 a plan, of a short scraper, which may be used alone or as a section or single element of a long composite scraper. Fig. 7 shows in front view the mounting of a plurality of sections forming a long continuous composite scraper, and Fig. 8 shows in a similar view the mounting of the sections forming a long discontinuous scraper.

In each of the figures similar letters of reference denote similar parts.

Referring to Figs. 1 and 2, the scraper A is bolted to the plate B, which has a round central tailpiece C, freely fitting into a vertical hole into the carrier-bracket D. This carrier-bracket is freely mounted upon a rod E, fixed parallel with the normal axis of the rotary body and at such a distance therefrom that the scraper can make the required contact. The carrier-bracket is provided with a tailpiece, such as F, on which a counterweight may be fitted, or to which a spring, as shown by Fig. 5, can be attached to force the scraper into contact with the rotary body.

In the modification represented by Fig. 3 the plate B has a central projection or lug C' at a right angle, which is bored to fit freely upon a round stud D', fixed in or forming part of the carrier-bracket D. With either construction it will be seen that under the force of gravity or of a spring or springs the scraper can yield or be moved about the axis of the rod E and at the same time about an axis at right angles to E. The carrier-bracket may have its linear displacement prevented by sleeves or ferrules G G on the rod E.

Figs. 4, 5, and 6 illustrate the construction of an individual element or section for a composite continuous or discontinuous scraper, each element resembling the scraper shown by Fig. 1 except in length. The individual elements may be assembled to form a composite scraper in various ways—for example, as illustrated by Fig. 8, they may be arranged alternately on two rods E E, parallel with each other and parallel and equidistant from the normal axis of the rotary part. The distance between the sections is less than their width, so that the sections in either row overlap those in the contiguous row or rows. This is necessary to insure that the whole surface of the rotary body is acted on fully. The sections may be arranged in three or more rows, in which cases the arrangement of the sections would correspond with that shown by Fig. 8. The sections are maintained in their respective relative positions by the sleeve distance-pieces G G.

In the continuous form of the composite scraper shown by Fig. 7 all the sections are assembled side by side on a single rod E. This arrangement, however, is less effective in some cases, as it may leave small ridges of material on the rotary body between the sections.

In ordinary cases the scraper may be constructed, as shown by Fig. 1, in a single piece; but where such a scraper would be of considerable length or where it may be subjected to a heating effect, in either of which cases it may become bent or distorted, the scraper should be constructed as illustrated by Figs. 7 or 8.

What I do claim as my invention, and desire to secure by Letters Patent, is—

1. A scraper for rollers, wheels, and similar rotary bodies, consisting of a single blade centrally pivoted on a carrier-bracket which is freely mounted upon a rod parallel with the axis of the rotary body, substantially as described.

2. A scraper for rollers, wheels, and similar rotary bodies, consisting of a plurality of sections, each of which comprises a blade centrally pivoted upon a carrier-bracket, which is freely mounted upon a rod fixed parallel with the axis of the rotary body, substantially as described.

3. A scraper for rollers, wheels, and similar rotary bodies, consisting of a plurality of sections each of which comprises a blade centrally pivoted upon a carrier-bracket, the sections being mounted successively upon a plurality of rods parallel with the axis of the rotary body, substantially as described.

4. In combination with a roller-scraper, a carrier-bracket constructed with a hole to fit upon a supporting-rod freely, and provided with means whereby the scraper can be centrally pivoted thereto at right angles to the said hole, substantially as described.

In witness whereof I have subscribed my name to this specification in the presence of two subscribing witnesses.

RICHARD CLUCAS.

Witnesses:
JOSEPH ERNEST FAULKNER,
WILLIAM E. HEYS.